(12) United States Patent
Miller et al.

(10) Patent No.: US 9,976,667 B2
(45) Date of Patent: May 22, 2018

(54) TEMPERATURE CONTROLLED VALVES (71) Applicant: Activalve Limited, Dublin (IE)

(72) Inventors: Mark Kenneth Miller, London (GB); Kevin Andrew Houlihan, Dublin (IE)

(73) Assignee: ACTIVALVE LIMITED, Dublin (IE)

( * ) Notice: Subject to any disclaimer, the term of this patent is extended or adjusted under 35 U.S.C. 154(b) by 0 days. days.

(21) Appl. No.: 14/759,950

(22) PCT Filed: Jan. 3, 2014

(86) PCT No.: PCT/GB2014/050008
§ 371 (c)(1),
(2) Date: Jul. 9, 2015

(87) PCT Pub. No.: WO2014/108669
PCT Pub. Date: Jul. 17, 2014

(65) Prior Publication Data
US 2015/0345653 A1 Dec. 3, 2015

(30) Foreign Application Priority Data

Jan. 14, 2013 (GB) .................................. 1300560.8

(51) Int. Cl.
*F16K 31/00* (2006.01)
*F16K 1/32* (2006.01)
(Continued)

(52) U.S. Cl.
CPC .............. *F16K 31/002* (2013.01); *A62C 2/24* (2013.01); *F16K 1/32* (2013.01); *F16K 17/386* (2013.01);
(Continued)

(58) Field of Classification Search
CPC . F16K 3/002; F16K 35/04; F16K 1/32; F16K 17/386; F16K 31/002; A62C 2/24; Y10T 137/0318; Y10T 137/1189
(Continued)

(56) References Cited

U.S. PATENT DOCUMENTS 410,693 A * 9/1889 Miller ....................... E03B 7/10
 137/61
654,599 A * 7/1900 Bunting, Jr. .............. E03D 1/34
 251/49
(Continued)

FOREIGN PATENT DOCUMENTS

BE 905305 A1 12/1986
EP 0118230 A1 9/1984
FR 2770613 A1 5/1999

*Primary Examiner* — Minh Le
(74) *Attorney, Agent, or Firm* — Hultquist, PLLC; Steven J. Hultquist (57) ABSTRACT

A controller opens or closes a valve in response to the ambient temperature crossing a threshold value, for example to prevent the continued supply of water to pipes that might have frozen and burst. An output shaft (4) acts on a stem of the valve to rotate it between the open and closed positions. A clock spring (8) biases the output shaft towards one of those positions but is restrained by a latch (28) until a thermal actuator (30) operates mechanically to release the latch in response to a change in temperature. The latch may be a pawl (28) acting on a ratchet gear (22) that allows the output shaft (4) to rotate in one direction but not the other. The ratchet gear (22) may be mounted on an input shaft (14), which is connected to the output shaft (4) through a gear train (16-19) to give a mechanical advantage when turning the output shaft (4) against the force of the spring (8).

17 Claims, 12 Drawing Sheets (51) Int. Cl.
*F16K 35/04* (2006.01)
*A62C 2/24* (2006.01)
*F16K 17/38* (2006.01)

(52) U.S. Cl.
CPC ......... *F16K 35/04* (2013.01); *Y10T 137/0318* (2015.04); *Y10T 137/1189* (2015.04)

(58) Field of Classification Search
USPC ....... 137/79, 315.38, 457, 522, 523; 251/49, 251/66, 89, 74, 107, 109
See application file for complete search history.

(56) References Cited

U.S. PATENT DOCUMENTS

| | | | | |
|---|---|---|---|---|
| 1,736,289 A * | 11/1929 | Murray | ................ | F16K 17/386 137/77 |
| 1,774,395 A * | 8/1930 | Murray | ................ | F16K 17/386 137/77 |
| 1,775,777 A * | 9/1930 | Ormsby | ................ | G08B 17/06 116/102 |
| 2,169,321 A * | 8/1939 | Jones | ................ | F02M 31/083 137/527.8 |
| 2,369,887 A * | 2/1945 | Eckman | ............. | G05D 23/1856 137/14 |
| 2,467,944 A * | 4/1949 | Munson | ........................... | 137/65 |
| 3,889,924 A * | 6/1975 | Karpenko | ............... | F16K 31/53 185/40 R |
| 4,131,133 A * | 12/1978 | Huwe | .................. | A01G 25/165 137/624.11 |
| 4,361,167 A | 11/1982 | Harasewych | | |
| 4,533,114 A * | 8/1985 | Cory | ..................... | F16K 17/386 137/75 |
| 4,643,038 A * | 2/1987 | Byram | .................. | B60K 31/02 180/178 |
| 5,113,891 A | 5/1992 | Carney | | |
| 5,427,132 A | 6/1995 | Fenner, Jr. et al. | | |
| 5,728,001 A * | 3/1998 | Attridge, Jr. | ............. | A62C 2/24 137/79 |
| 5,983,936 A * | 11/1999 | Schwieterman | ........ | F16F 1/041 137/615 |
| 6,393,931 B1 * | 5/2002 | Spangenberg | ............ | F16H 3/06 251/249.5 |
| 6,959,719 B2 * | 11/2005 | Truss | ..................... | A62C 2/065 137/72 |
| 8,051,915 B2 * | 11/2011 | Blease | .................. | A62C 35/68 169/16 |
| 8,167,266 B2 * | 5/2012 | Kim | ........................ | F16K 31/05 251/129.03 |
| 9,435,462 B2 * | 9/2016 | Conn | ...................... | F16K 31/56 |
| 2004/0050385 A1 * | 3/2004 | Bonney | ............ | A61M 15/0065 128/203.15 |
| 2007/0137704 A1 * | 6/2007 | Hartley | .................. | B65D 88/12 137/75 |

\* cited by examiner

Fig. 11

TEMPERATURE CONTROLLED VALVES

CROSS-REFERENCE TO RELATED APPLICATIONS

This application is a U.S. national phase under the provisions of 35 U.S.C. § 371 of International Patent Application No. PCT/GB14/50008 filed Jan. 3, 2014, which in turn claims priority of United Kingdom Patent Application No. 1300560.8 filed Jan. 14, 2013. The disclosures of such international patent application and United Kingdom priority patent application are hereby incorporated herein by reference in their respective entireties, for all purposes.

DESCRIPTION

Technical Field

The invention relates to valves for controlling the supply of water or other fluids through pipes that are liable to rupture when water in the pipes freezes. It has particular application to stop cocks for controlling the flow of water into domestic or commercial premises from a public supply. It may also be used to control the flow of water to outdoor pipes that are exposed to ambient temperatures in cold climates. In further applications, the valve can control the flow of water from a storage tank or the flow of gas from a supply.

Background of the Invention

The problem of frozen pipes is well known. When a water pipe is exposed to low ambient temperatures, there is a risk that the water in it may freeze. The resulting ice occupies a greater volume than the original water and can cause the pipe to burst so that after the ice has thawed water can leak from the ruptured pipe. Burst pipes are a particular problem where water supply pipes pass through uninsulated roof spaces or adjacent to cold outside walls of a building. Water continuing to be supplied to the pipe at mains pressure can leak out and cascade through the building, causing significant damage. The risk is exacerbated in unoccupied properties because the temperature is more likely to fall below freezing and resulting leaks may go undetected for a long time.

Solutions to the problem of frozen pipes have been suggested, which use a temperature-responsive valve to shut off the water supply when the temperature falls close to freezing point. In the case where the water is delivered from a storage tank rather than a mains supply, an alternative option is to open the valve in order to drain the tank at the approach of freezing temperatures and thus prevent the risk of uncontrolled release of the water owing to a burst pipe. A third option is to open the valve to allow a continuous small flow of water to a drain because flowing water is less likely to freeze than stationary water. In many cases such temperature-responsive valves operate under electronic control in response to input from temperature sensors. However, a solution that does not depend on a power supply would be preferable.

U.S. Pat. No. 5,427,132 discloses in FIGS. 8 and 9 a temperature shut-off valve that is controlled by a wax-based thermal actuator. At low temperatures the wax in the actuator contracts and causes a piston acting through a simple rack-and-pinion arrangement to turn the valve member through a quarter turn. However, the direct connection between the actuator and the valve gives rise to two apparent difficulties. First, it seems unlikely that such an actuator can provide sufficient force (or alternatively sufficient displacement of the piston) to turn the valve and close it securely. Second, when the temperature rises again, the expanding wax in the actuator will cause the valve to re-open, which will allow water to resume flowing and to leak through any rupture that has been caused during the freezing conditions.

SUMMARY OF THE INVENTION

The invention provides a temperature-responsive valve controller as defined in claim 1.

The invention further provides a method of operating a temperature controlled valve as defined in claim 13.

Preferred but non-essential features of the invention are defined in the dependent claims.

The invention solves the problems of the prior art because energy stored in a spring is used to drive the valve to its second position. The thermal actuator has only to provide sufficient energy, force and displacement to release the latch, which makes its design much simpler so an off-the-shelf actuator is likely to be sufficient.

In the typical application of the invention to control the flow of water from an external supply, for example in place of a domestic stop cock, the purpose of the invention is not to prevent burst pipes. The pipes downstream of the valve will typically remain full of water even when the valve has been closed and therefore they are still liable to freezing. Instead, the purpose of the invention is to prevent the damage caused by resuming the supply of water to a pipe after it has burst. Once the latch has been released, the valve remains held closed by the force of the spring until it is manually reset, which can be deferred until after a check for damage has been carried out.

The temperature-responsive valve controller of FIGS. 1 to 6 comprises a housing 2 (visible in FIGS. 4 to 6) in which an output shaft 4 is mounted for rotation about its axis. In one end of the output shaft 4, which is exposed to the exterior of the housing 2, there is formed a blind bore 6 for receiving the stem of a valve (not illustrated) that is to be controlled. As illustrated, the blind bore 6 has a generally square cross section suitable for engaging the square valve stem of a standard stop cock for domestic water supplies in Europe. Such a stop cock is mounted on the main water supply pipe into a property and requires a quarter turn to move it from the fully open to the fully closed position. Of course, the recess may be sized and shaped to complement the cross section of any other type of valve stem; alternatively the end of the output shaft 4 may project out of the housing 2 to engage with a recess in a valve stem. Means such as a mounting plate (not illustrated) are provided for mounting the housing 2 of the valve controller adjacent to the valve. The housing 2 may conveniently be formed as a shell comprising two parts secured together by screws 7 or other fixing means.

A clock spring 8 is wound spirally about the output shaft 4. An inner end of the spring 8 is fixed in a channel 10 in the output shaft 4 and an outer end 12 of the spring is fixed to the housing 2. When the output shaft 4 is turned in a direction to open the valve (which is the anti-clockwise direction as viewed in FIG. 1) the spring 8 tightens and exerts a restoring force on the output shaft 4 to urge the valve back towards its closed position. The shaft 4 and spring 8 may be arranged such that even when the valve is fully closed the spring 8 continues to exert a force on it, thereby helping to ensure that the valve closes fully and remains held closed by the force of the spring 8.

An input shaft 14 is also rotatably mounted in the housing 2. One end of the input shaft 14 extends out of the housing 2 through a face opposite to the face where the end of the output shaft 4 is exposed. The input shaft 14 thus points away from the valve. The exposed end of the input shaft 14 may be formed with an integral handle (not shown) or with splines or other suitable means (not shown) for attaching a handle. The handle is preferably in the form of a wheel similar to the ones that are typically attached to stop cocks. A wheel-type handle has the advantage that it turns within its own diameter, whereas a crank-type handle needs space around it to turn without being blocked and without causing damage.

The input shaft 14 is coupled to the output shaft 4 through a gear train, which provides a mechanical advantage when the handle on the input shaft 14 is used to open the valve against the force of the clock spring 8. In the illustrated embodiment of the invention, the gear train comprises four gears 16,17,18,19 and an intermediate shaft 20 that is rotatably mounted in the housing 2. A first gear 16 is mounted on the input shaft 14; second and third gears 17,18 are mounted on the intermediate shaft 20; and a fourth gear 19 is mounted on the output shaft 4. Each gear rotates with the shaft on which it is mounted. The first gear 16 engages the second gear 17 with a gear ratio of 3:1 and the third gear 18 engages the fourth gear 19 with a gear ratio of 4:1, whereby the entire gear train gives a mechanical advantage of 12:1. Of course, the number of gears and the ratios between them may be varied to suit the circumstances of each embodiment of the invention. As seen most clearly in FIG. 3, in this embodiment the fourth gear 19 may be only a sector gear because the output shaft 4 needs to turn the valve through only 90°.

The input shaft 14 also carries a ratchet gear 22. A rocker arm 24 is mounted in the housing 2 to be rotatable about a pivot point 26, whereby a pawl 28 on the rocker arm 24 can be moved into or out of engagement with the teeth of the ratchet gear 22. The pawl serves as a latch to prevent the gear turning in one direction (the anti-clockwise direction as viewed in FIG. 3). Engagement of the pawl 28 with the ratchet gear 22 therefore acts through the gear train 16,17, 18,19 to restrain the output shaft 4 from turning and to prevent the valve from closing under the influence of the clock spring 8. The pawl 28 does not prevent the ratchet gear 22 from turning in the opposite direction (clockwise in FIG. 3) so it remains possible to turn the handle and rotate the input shaft 14 to open the valve.

A thermal actuator 30 is also mounted within the housing 2. Various types of thermal actuator could be used, which generate linear movement as a mechanical response to a change in ambient temperature. Examples include elements formed from shape memory alloys and bimetal strips or cups. It is preferred that no external source of power should be required. The drawings show the preferred type of actuator 30, which is a wax thermal actuator. It comprises a piston 32 that slides in a guide 34 in response to the thermal expansion or contraction of a body of wax or other medium (not visible in the drawings). An internal or external return spring (not illustrated) may be required to drive the retraction of the piston 32 into the guide 34 in response to contraction of the medium. Wax thermal actuators are readily available commercially and the details of their construction and operation do not form part of the present invention.

In the present embodiment of the invention, a hook 38 is formed on an end of the rocker arm 24 that is remote from the pawl 28. The hook 38 is engaged by a loop 36 formed on the end of the piston 32 of the thermal actuator 30. When the ambient temperature falls below a threshold value close to freezing point, the piston 32 retracts and the loop 36 pulls down on the hook 38. This causes the rocker arm 24 to pivot about point 26 and lift the pawl 28 clear of the teeth of the ratchet gear 22. The ratchet gear 22, input shaft 14, gear train 16-19 and output shaft 4 thereby become free to rotate using energy stored in the clock spring 8, whereby the valve controller drives the valve to its closed position and prevents water flowing into pipes that are liable to become frozen.

Figure 4:
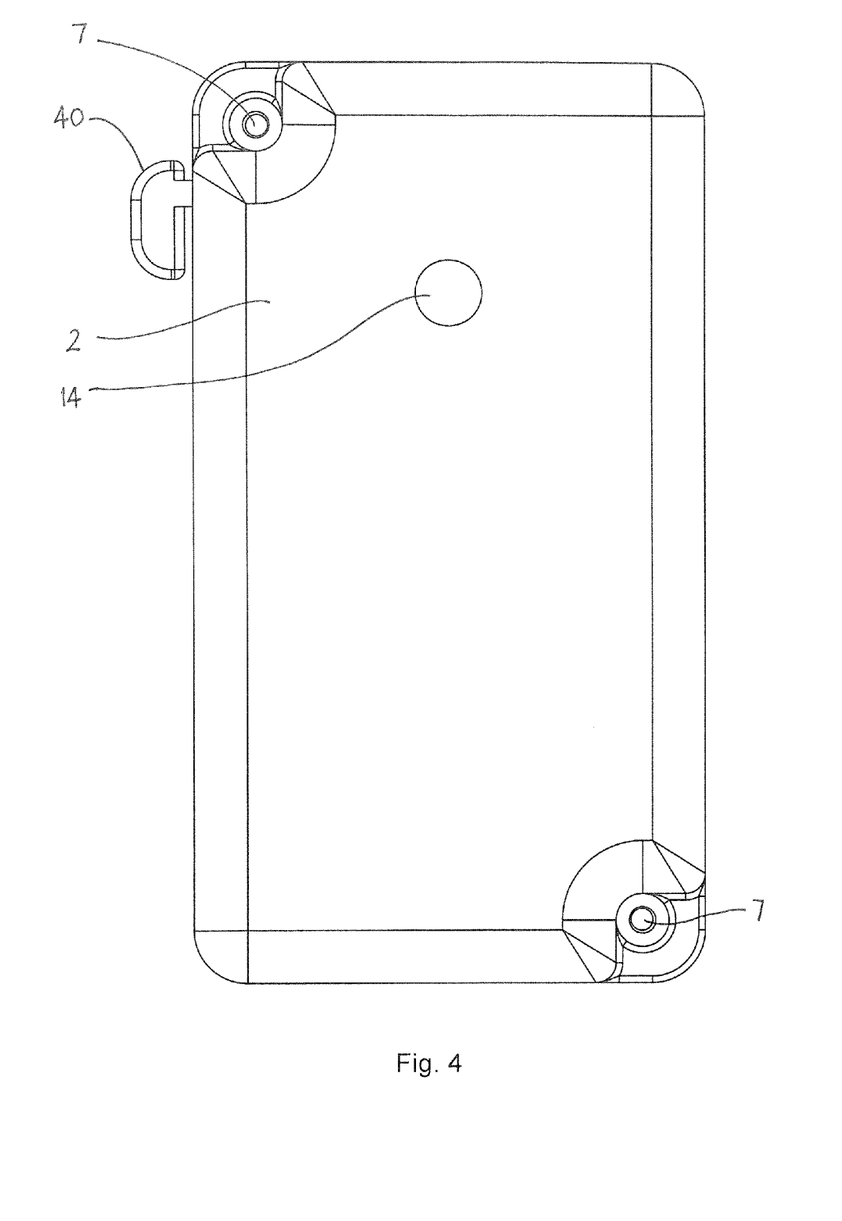
FIG. 4 is a front view of the valve controller of FIG. 1 enclosed in a housing.
Figure 5:
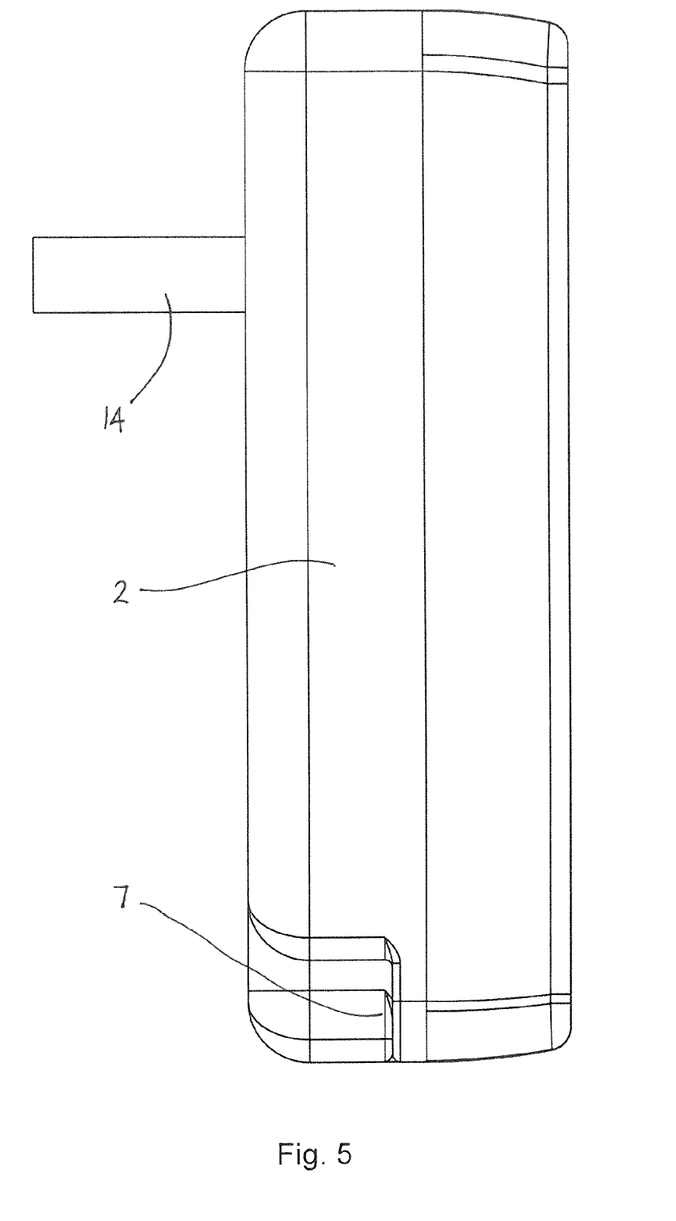
FIG. 5 is a right side view of the valve controller of FIG. 4.
Figure 6:
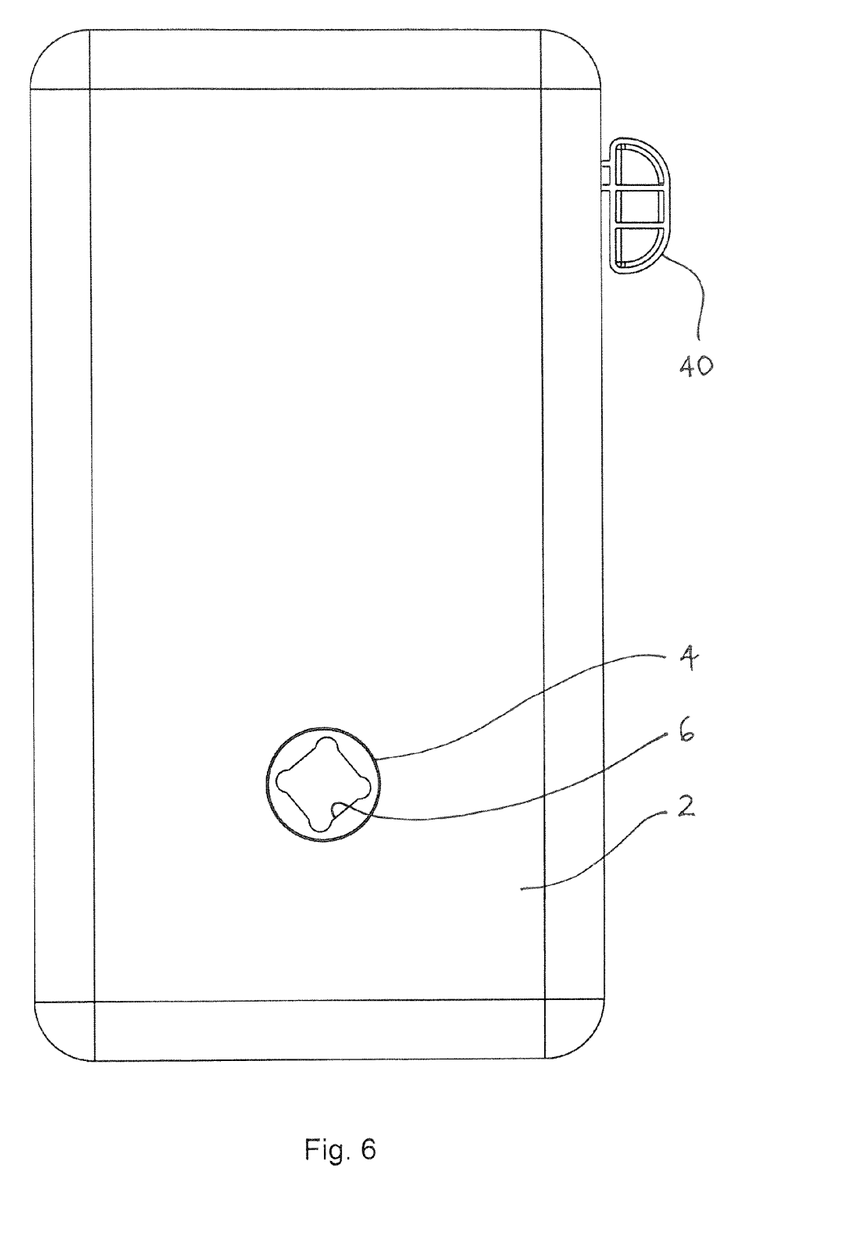
FIG. 6 is a rear view of the valve controller of FIG. 4.

The valve controller may be provided with one or more trip means, which can be manually operated to close the valve using the energy of the clock spring 8 even when the ambient temperature has not fallen below the threshold value. In FIGS. 1 to 6, the end of the rocker arm 24 remote from the thermal actuator carries a trip lever 40, which extends outside the housing 2 (FIG. 4). A user can manually lift the trip lever 40 to disengage the pawl 28 from the ratchet gear 22 and release the mechanism to drive the valve closed. The loop 36 formed on the piston 32 of the actuator 30 is large enough not to interfere with the manual movement of the rocker arm 24 in this way.

It is evident that the trip lever could equally be formed on the end of the rocker arm 24 that is adjacent to the thermal actuator, in which case the lever would need to be depressed in order to release the mechanism. In other embodiments, the lever could be turned through 90° to extend from the top of the housing 2. By providing suitable linkages within the housing 2, a lever or push button located almost anywhere on its exterior could be arranged to effect the desired movement of the rocker arm 24.

Figure 1:
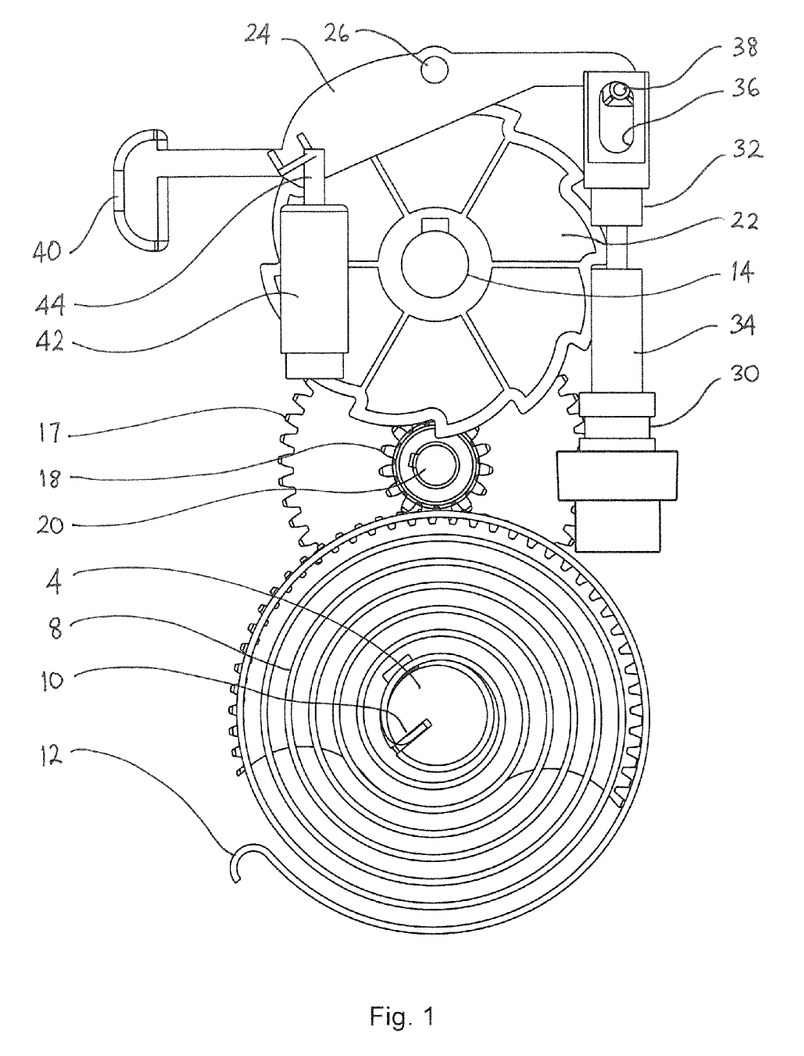
FIG. 1 is a front view of a temperature-responsive valve controller in accordance with the present invention, without its housing.
Figure 2:
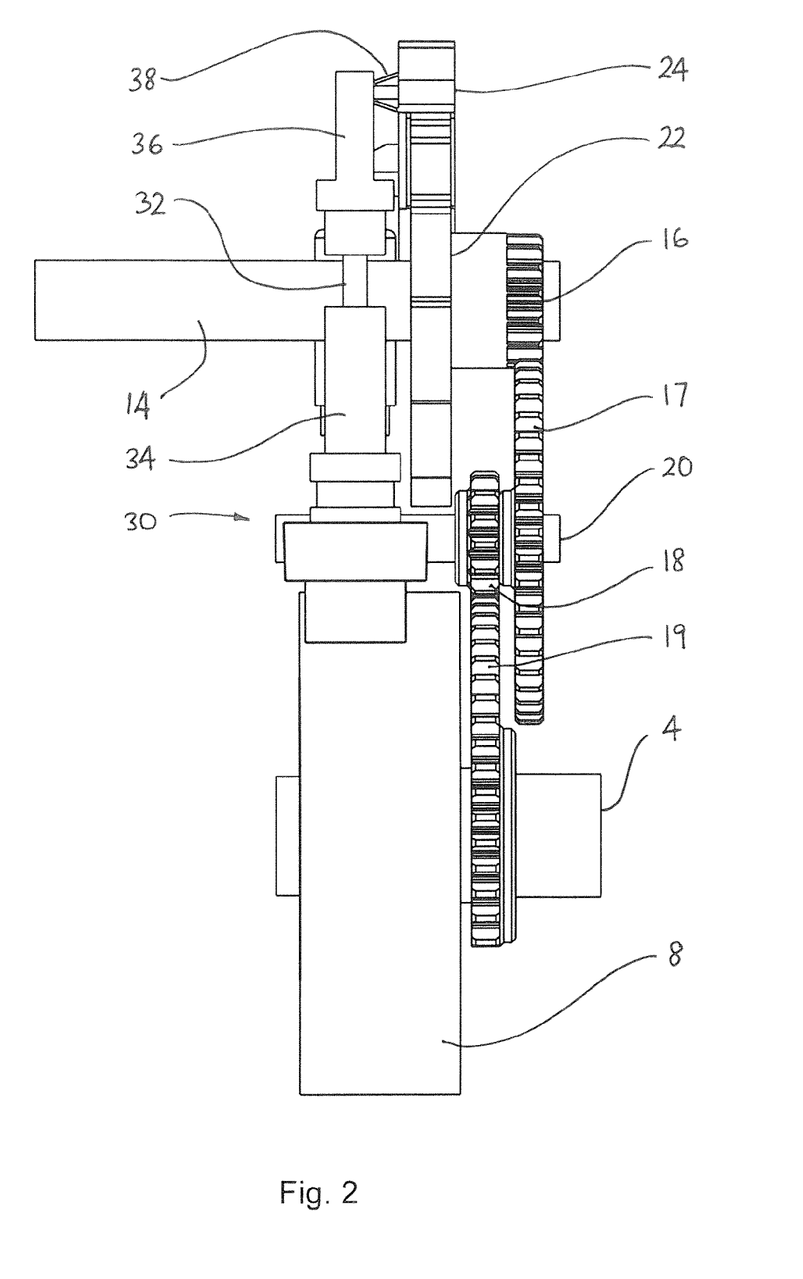
FIG. 2 is right side view of the valve controller of FIG. 1.
Figure 3:
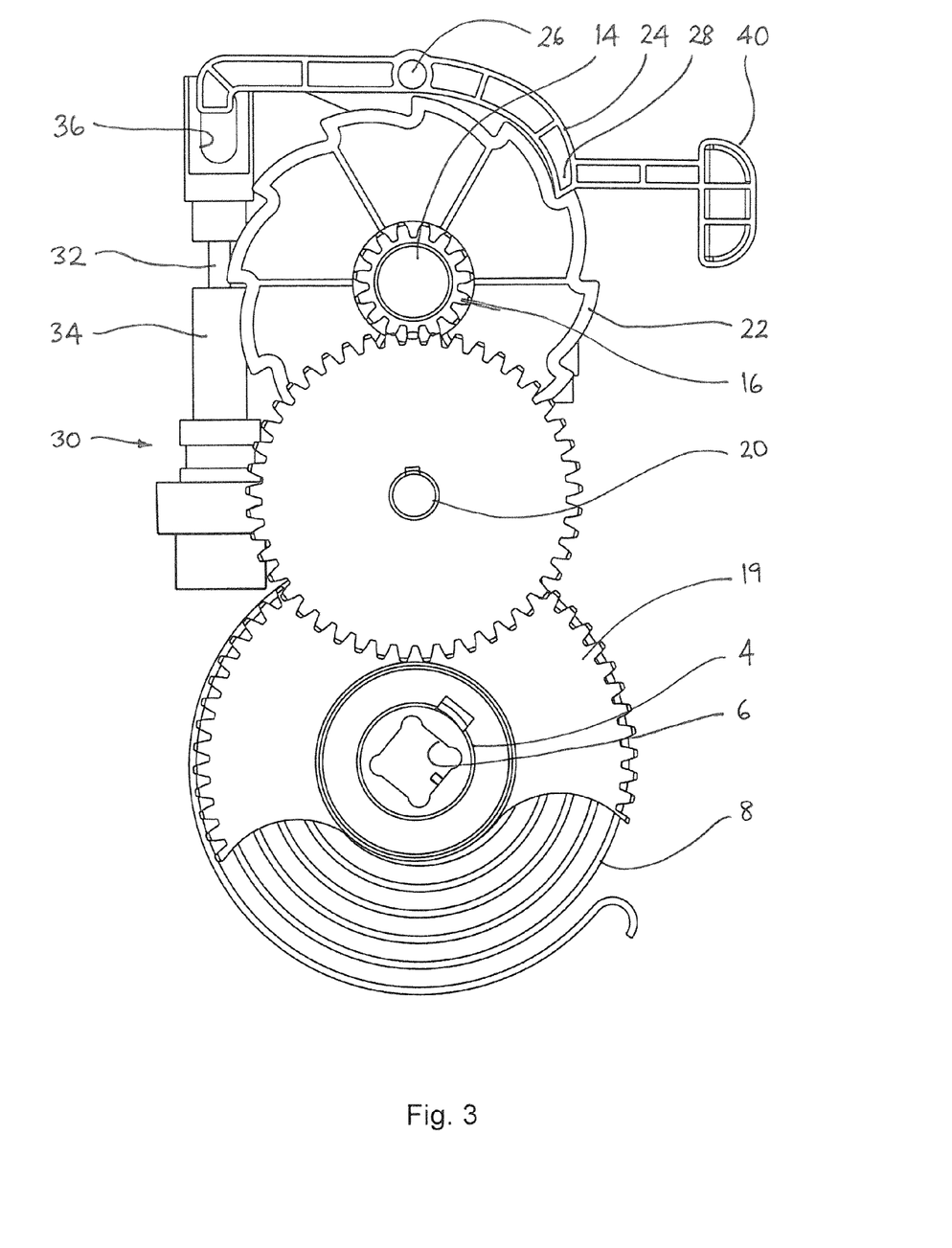
FIG. 3 is rear view of the valve controller of FIG. 1.

Stop cocks and other valves are frequently installed in locations that are difficult to access so it may be desirable to provide a trip means that can be remotely operated. In this embodiment of the invention, an example of a remotely operated trip means comprises a cylinder 42 and a piston 44 that slides within the cylinder (FIG. 1). The exposed part of the piston is coupled to the rocker arm 24 so that, when extended, the piston will lift the pawl 28 clear of the teeth of the ratchet gear 22. A flexible tube (not illustrated) connects the cylinder 44 to a remote switch in a location that is convenient for the user. By manually operating the switch, the piston 42 can be pneumatically, hydraulically or mechanically (e.g. by use of a Bowden cable) controlled through the tube.

Figure 7:
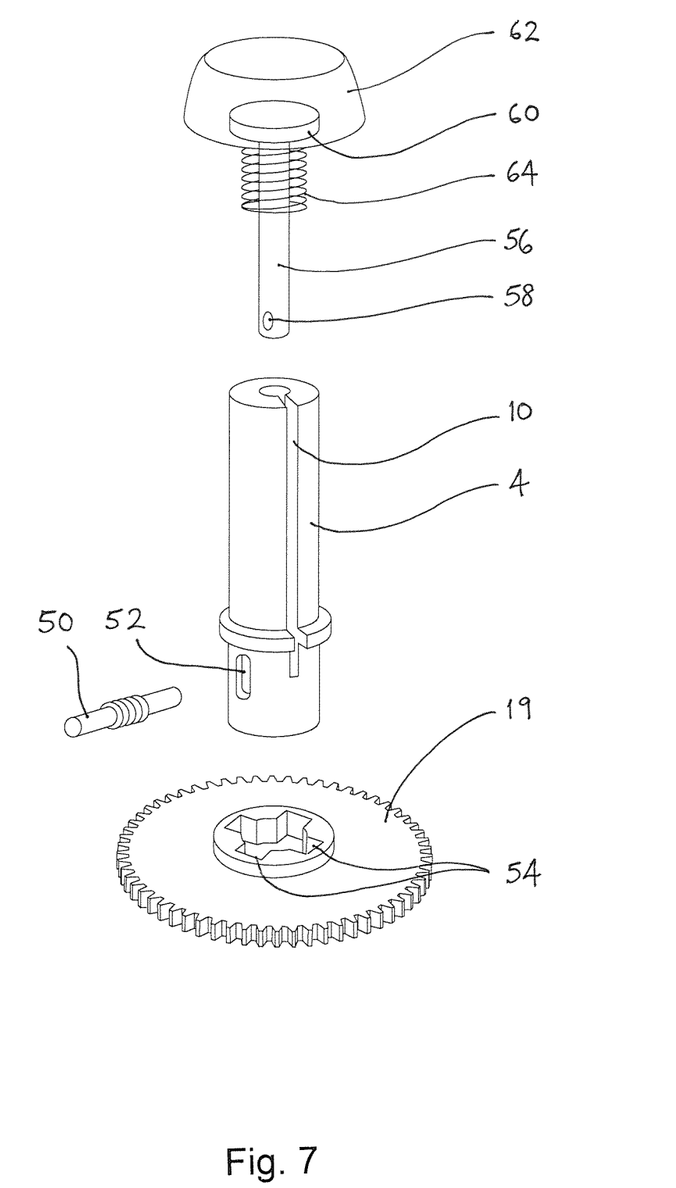
FIG. 7 is an exploded, perspective view of the output shaft of a valve controller in accordance with a second embodiment of the invention, illustrating a first alternative trip means.
Figure 8:
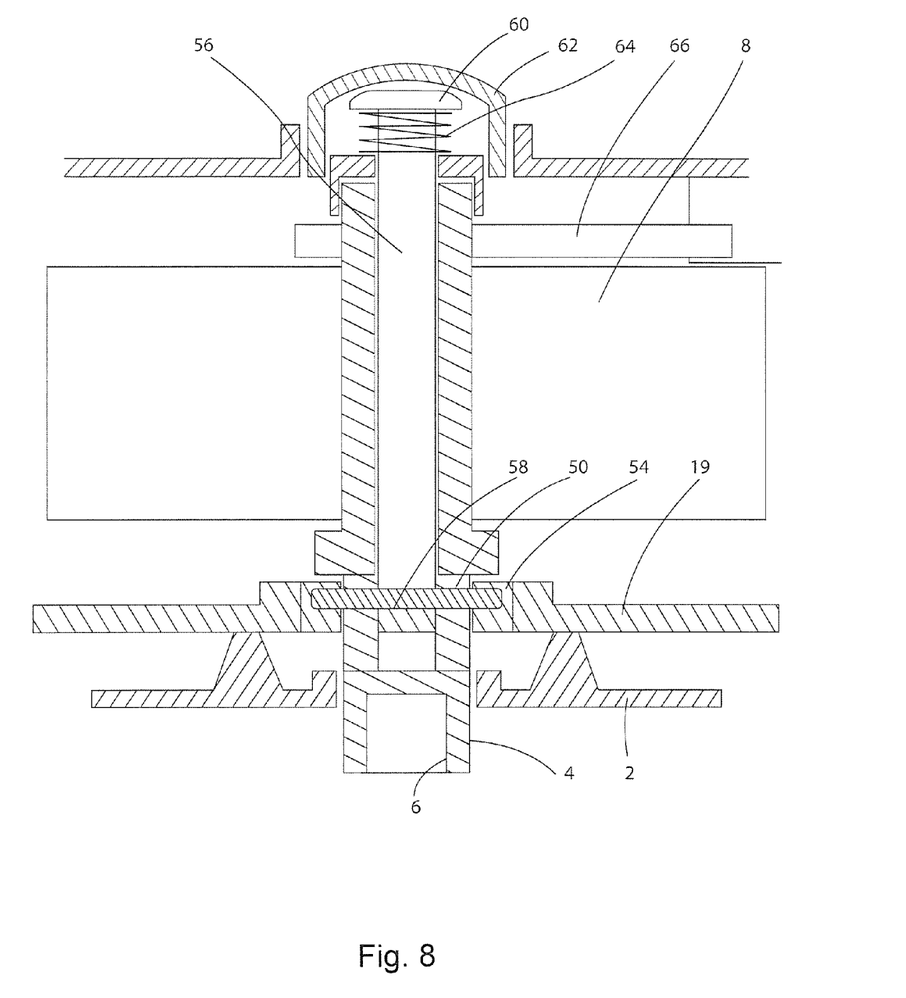
FIG. 8 is a cross-sectional view on the axis of the output shaft of the valve controller of FIG. 7.

FIGS. 7 and 8 illustrate an embodiment of the invention that incorporates an alternative trip means. In this embodiment, the fourth gear 19 of the gear train is not fixed to the output shaft 4 directly but via a transmission pin 50. The transmission pin 50 extends through opposing slots 52 in the output shaft 4 and projects beyond the slots 52 to engage with opposing keyway features 54 formed in the fourth gear 19. As illustrated, there are two pairs of opposing keyways 54 but a single pair or a higher number of pairs are also possible. (The more pairs of keyways 54 there are, the smaller the angle through which the gear 19 will have to be turned before a pair of keyways 54 can engage with the transmission pin 50.) In this configuration, the transmission pin 50 transmits torque between the fourth gear 19 and the output shaft 4 so that the mechanism functions just as described in relation to FIGS. 1 to 6.

The output shaft 4 in this embodiment is hollow and along its centre extends a trip pin 56. Near one end, the trip pin 56 is perforated by a transverse aperture 58, which surrounds the transmission pin 50 between the slots 52 of the output shaft. The other end 60 of the trip pin 56, being the end remote from the valve, protrudes from the exterior of the housing 2 and terminates in a trip button 62, which may be formed integrally with the trip pin 56 or may be a separate component as shown. A return spring 64 biases the trip pin 56 outwards (i.e. towards its protruding end) which maintains the transmission pin 50 in engagement with the keyways 54.

When the trip button 62 is manually pressed, the trip pin 56 is forced downwards (as viewed in FIG. 8) and the transmission pin 50 is carried with it so that it moves along the longitudinally aligned slots 52 in the walls of the output shaft 4 and out of engagement with the keyways 54 in the fourth gear 19. This has the effect of decoupling the gear train 16-19 from the output shaft 4 so that the output shaft becomes free to rotate and to close the valve under the influence of the clock spring 8, even though the input shaft 14 and the gear train 16-19 remain prevented from rotating by engagement between the pawl 28 and the ratchet gear 22. (The input shaft 14, ratchet gear 22 and pawl 28 are not shown in FIGS. 7 and 8 but may be identical to those in FIGS. 1 to 3.)

FIG. 8 also shows schematically a status indicator 66 mounted on the output shaft 4, which turns with the shaft 4 and can be viewed from outside the housing 2, for example through an opening or a window (not shown). This allows the user to see easily whether the valve is in the open or closed state.

Figure 9:
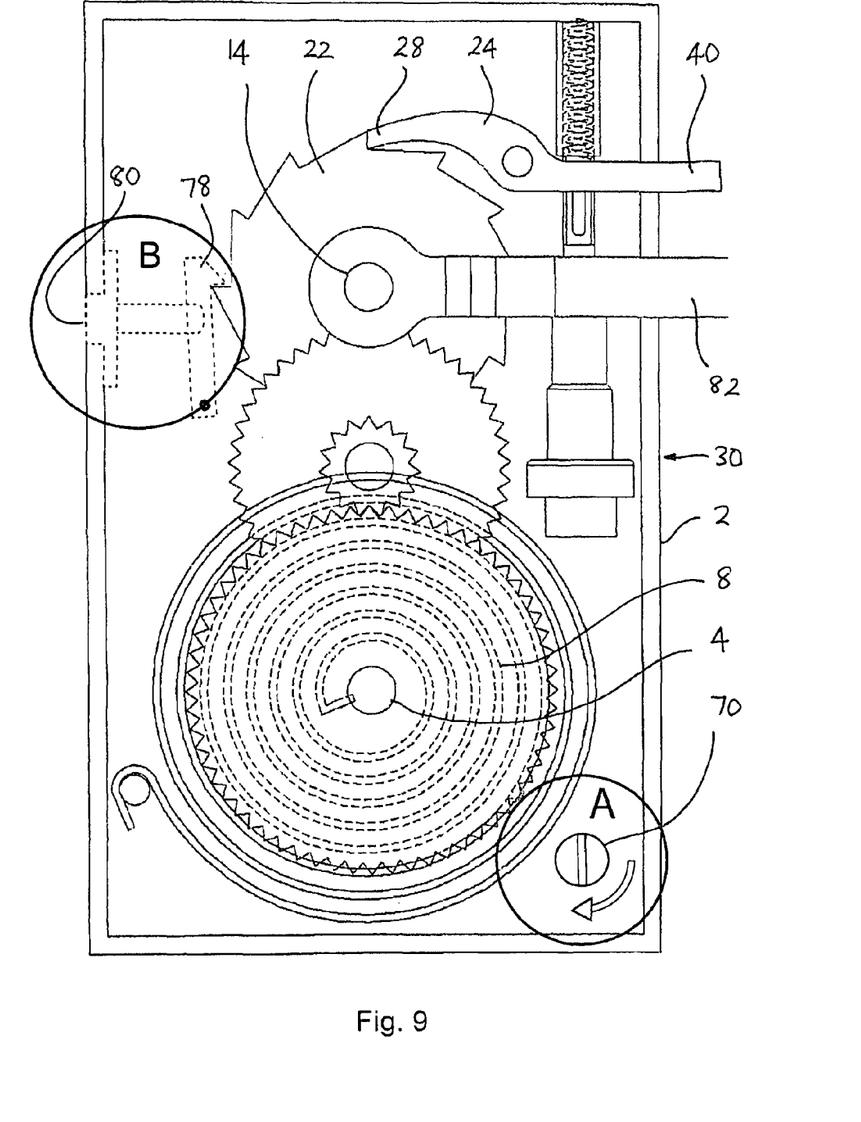
FIG. 9 is a front view of a third embodiment of temperature-responsive valve controller in accordance with the invention, illustrating two alternative override means, enlargements of which are shown schematically in FIGS. 9A and 9B.

The valve controller may be further provided with an override means which, in contrast to the trip means, prevents the controller from closing the valve even when the ambient temperature does fall below the threshold value. FIG. 9 illustrates a valve controller in accordance with the invention, which differs from the embodiment of FIGS. 1 to 6 in only minor respects except that it demonstrates two alternative kinds of override means. It would not usually be necessary to include both kinds in a single valve controller.

Figure 9A:
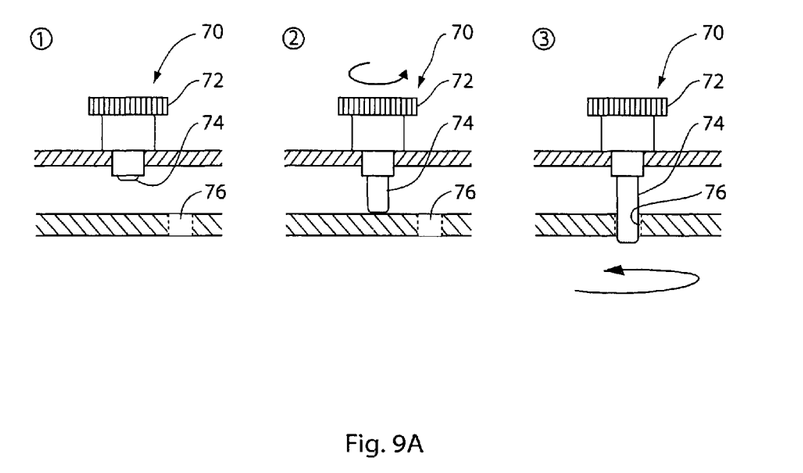

FIG. 9A shows an override means that makes use of a locking plunger 70 to prevent rotation of the fourth gear 19. Such locking plungers are commercially available items. The locking plunger 70 is mounted in an aperture in the housing 2 so that a thumbwheel 72 is presented on the exterior of the housing. Rotation of the thumbwheel 72 causes a pin 74 to be pushed into the interior of the housing where it can engage in one of a series of holes 76 around the periphery of the fourth gear 19 and prevent the fourth gear and the associated output shaft 4 from rotating, even if the pawl 28 is released. Evidently the locking plunger 70 could work similarly by engagement with any of the other gears 16,17,18,22.

Figure 9B:
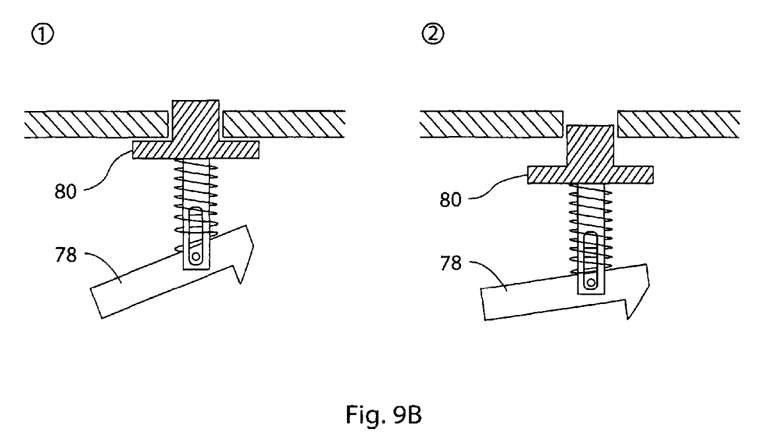

FIG. 9B shows an override means that makes use of a second, override pawl 78 that engages the ratchet gear 22 independently of the first pawl 28. The override pawl 78 can be pushed into engagement with the ratchet gear 22 using a button 80 accessible from the exterior of the housing 2. The override pawl 78 then acts to prevent rotation of the ratchet gear 22 and the remainder of the mechanism so that the valve cannot be closed even when the first pawl 28 is disengaged automatically by the thermal actuator 30. It will be noticed that the connection between the button 80 and the override pawl 78 includes a degree of freedom to allow the pawl 78 to ride over the teeth of the ratchet gear 22 when the gear is rotated in the anti-clockwise direction (as viewed in FIG. 9) during winding of the handle 82 to open the valve.

The button 80 may be provided with a protruding finger grip (not shown) to allow it to be pulled up again when the override pawl 78 needs to be disengaged.

Figure 10:
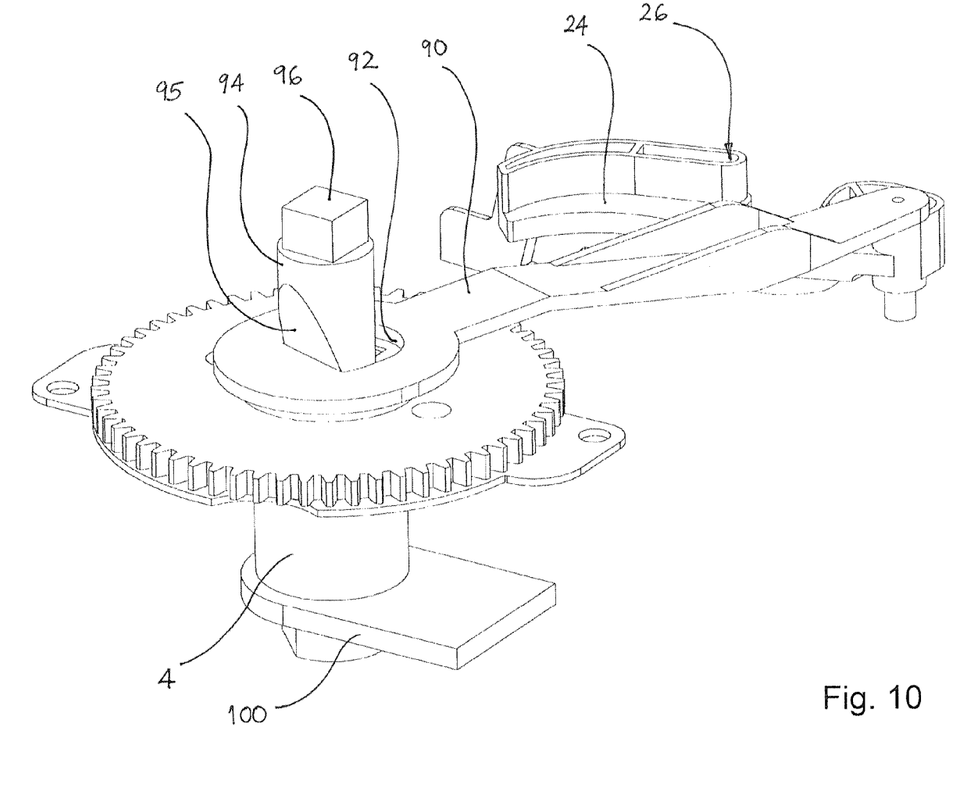
FIG. 10 is a perspective view of part of a fourth embodiment of valve controller in accordance with the invention, illustrating a second alternative trip means.

FIG. 10 illustrates a second alternative trip means in relation to the output shaft 4 and rocker arm 24. The components of the trip means are shown in exploded view in FIG. 11. A first end of a link arm 90 is connected to an end of the rocker arm 24, adjacent to the point where the rocker arm 24 engages the thermal actuator. A second end of the link arm 90 comprises a cut-out 92 that surrounds a trip pin 94. The trip pin 94 comprises an inclined cam surface 95, which engages the cut-out 92 of the link arm 90.

Figure 11:
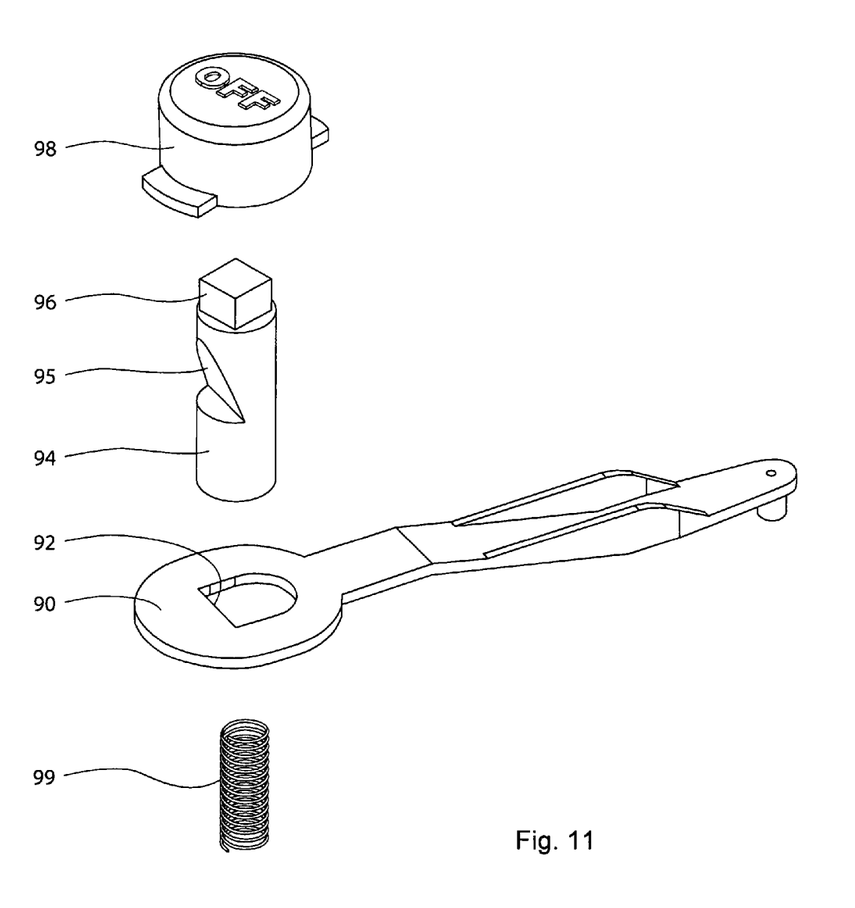
FIG. 11 is an exploded perspective view of the components of the trip means of FIG. 10.

A first end of the trip pin 94 is seated in a recess in the end of the output shaft 4. A second end of the trip pin 94 protrudes from the housing 2 and comprises an attachment 96 for a trip button 98 that located outside the housing 2. A helical spring 99 biases the trip pin 94 and trip button 98 in the outward direction.

In order to close the stop valve manually, a user pushes the trip button 98 against the force of the spring 99. Movement of the inclined cam surface 95 acts on the cut-out 92 to pull the link arm 90 in a direction generally parallel to its length. This in turn causes the rocker arm 24 to rotate about the pivot 26 and release the pawl 28 from the ratchet gear 22 so that the clock spring 8 becomes free to drive the valve closed as previously described.

Although the trip pin 94 of this embodiment is illustrated as being axially aligned with the output shaft 4 and seated in it, the trip pin 94 does not in fact rotate with the output shaft 4 or otherwise engage with it in any essential manner. Accordingly the trip pin 94, trip button 98 and the second end of the link arm 90 could instead be provided at any convenient alternative location.

FIG. 9 also illustrates a mechanical stop member 100 that is fixed on the output shaft 4. When the drive mechanism is released (whether manually via the trip button 98 or automatically by the thermal actuator 30) and the valve is driven closed under the influence of the clock spring 8, the mechanical stop member 100 rotates with the output shaft 4 until it collides with a post (not illustrated) or other element that is fixed in relation to the housing 2. The stop member 100 thus terminates the spring-driven movement in a controlled manner without causing damage to the valve.

The illustrated embodiments of the invention have been described with reference to the control of a valve that is driven through a quarter turn from its open to its closed position under the influence of the clock spring. However, it will be understood that in other applications, a similar quarter turn of the output shaft could be arranged to move the valve from its closed to its open position, e.g. to drain a water storage tank before freezing occurs or to permit a trickle flow of water through the pipe so that it is less likely to freeze.

Other types of valve may require more than a quarter turn for their operation. This would require no change in the mechanism of the invention other than to ensure that suitable values were chosen for the strength of the clock spring and the gear ratio, such that the required number of turns could be manually applied to the input shaft without undue effort.

The mechanism described herein would need very little adaptation to allow it to respond to a temperature that rises higher than a threshold value, for example to open a conduit from a storage tank to release water or other extinguishing agents in the event of a fire, or cooling agents in other temperature control applications. Another example would be to cut off the flow of gas or flammable liquid from a supply also in the event of a fire. Such applications are also intended to fall within the scope of the claimed invention.

The invention is not applicable only to pipes carrying water but could equally be used to protect pipes carrying other liquids that are liable to freeze. It may also be used to open or stem the flow of any other gas or liquid where control is required by means of mechanical thermal actuation. The thermal actuator would be designed so that its threshold temperature for actuation was appropriate for the freezing point of the liquid in question.

The invention claimed is:

1. A temperature-responsive valve controller comprising:
   an output shaft rotatable between a first position and a second position;
   a spring that acts on the output shaft to urge it towards the second position;
   a latch that restrains the output shaft against movement towards the second position under the influence of the spring;
   a thermal actuator, which generates linear movement as a mechanical response to changes in ambient temperature and which operates mechanically to release the latch in response to the ambient temperature crossing a threshold value;
   an input shaft;
   a gear train coupling the input shaft to the output shaft; and
   a handle arranged to drive rotation of the input shaft for manually moving the output shaft from the second position to the first position against the force of the spring;
   wherein the latch comprises a pawl that engages a ratchet gear mounted on the input shaft to restrain movement of the output shaft via the gear train.

2. The valve controller according to claim 1, wherein the spring is a clock spring acting on the output shaft.

3. The valve controller according to claim 1, further comprising a trip release for manually releasing the latch.

4. The valve controller according to claim 3, further comprising a mechanical, pneumatic or hydraulic control for remote operation of the trip release.

5. The valve controller according to claim 1, further comprising an override for preventing rotation of the output shaft if the latch is released.

6. The valve controller according to claim 1, further comprising an override for preventing the release of the latch.

7. A method of operating a temperature controlled valve comprising the steps of:
   rotating a valve member on an output shaft from a second position to a first position against the force of a spring;
   engaging a latch to restrain the valve member against movement towards the second position under the influence of the spring; and
   arranging a thermal actuator to generate linear, mechanical movement through the contraction of a medium in response to falling ambient temperature and thereby to release the latch in response to the ambient temperature crossing a threshold value;
   wherein the step of rotating the valve member comprises rotating a handle to drive rotation of an input shaft, the input shaft being coupled to the output shaft through a gear train to drive rotation of the output shaft.

8. The method according to claim 7, further comprising the step of manually using a trip release to release the latch when the ambient temperature has not crossed the threshold value.

9. The method according to claim 7, further comprising the step of manually setting an override to prevent the release of the latch if the ambient temperature crosses the threshold value.

10. The method according to claim 7, wherein the valve is open in the first position and closed in the second position.

11. The method according to claim 10, wherein the valve is a stop cock for a water supply to a building.

12. A temperature-responsive valve controller comprising:
   an output shaft rotatable between a first position and a second position;
   a spring that acts on the output shaft to urge it towards the second position;
   a latch that restrains the output shaft against movement towards the second position under the influence of the spring;
   a thermal actuator, which generates linear movement as a mechanical response to changes in ambient temperature and which operates mechanically to release the latch in response to the ambient temperature crossing a threshold value;
   an input shaft;
   a gear train coupling the input shaft to the output shaft; and
   a handle arranged to drive rotation of the input shaft for manually moving the output shaft from the second position to the first position against the force of the spring;
   wherein the thermal actuator operates by the contraction of a medium in response to falling temperature.

13. The valve controller according to claim 12, wherein the spring is a clock spring acting on the output shaft.

14. The valve controller according to claim 12, further comprising a trip release for manually releasing the latch.

15. The valve controller according to claim 14, further comprising a mechanical, pneumatic or hydraulic control for remote operation of the trip release.

16. The valve controller according to claim 12, further comprising an override for preventing rotation of the output shaft if the latch is released.

17. The valve controller according to claim 12, further comprising an override for preventing the release of the latch.

* * * * *